Patented Nov. 29, 1949

2,489,352

UNITED STATES PATENT OFFICE 2,489,352

HALOGEN COMPOUNDS OF 3-AMINO-BENZOTRIAZINE 1,2,4 OXIDE-1

Frank J. Wolf, Westfield, and Karl Pfister, III, Summit, N. J., assignors to Merck & Co., Inc., Rahway, N. J., a corporation of New Jersey No Drawing. Application April 10, 1946, Serial No. 661,084

5 Claims. (Cl. 260—249.5)

This invention relates to new organic chemical compounds possessing therapeutic activity, and to methods by which they may be produced from readily available starting materials. More particularly, it relates to the preparation of substituted 3-amino-benzotriazine-1,2,4-oxides-1, and to the valuable chemical compounds so produced.

The substituted 3-amino-1,2,4-benzotriazine-oxides-1, with which this invention is concerned, particularly those containing halogen, alkyl or alkoxy substituents on the benzene ring portion of the molecule, appear to possess potential therapeutic value for use in the treatment of malaria.

Benzo-1,2,4-triazine compounds with substituents in the 3-position, both with and without an oxygen atom linked to nitrogen, have previously been described in the chemical literature. However, the compounds thus prepared have been those in which the benzene ring portion of the molecule, i. e. the 5-,6-,7-, and 8-positions, have been unsubstituted. Compounds wherein halogen substituents, particularly chlorine and bromine substituents, are attached to the benzene ring portion of the benzotriazine compound have not previously been prepared. We have found these compounds to be especially promising in the treatment of malaria.

In preparing compounds of this type it has been usual first to prepare an aromatic guanidine intermediate compound by reacting nitro-aniline with cyanamide or cyanamide dihydrochloride. Previously it was considered that this general method would not be successful when the nitro group was attached ortho or para to the amino group of the nitro-aniline. However Arndt showed that a nitro-aniline of this type could be reacted to form an aromatic guanidine, although the reaction was unusually violent, especially in its initial phases. We have now found that in preparing, as the intermediate product, aromatic guanidines containing halogen, alkyl, or alkoxy substituents on the benzene ring portion thereof by reacting ortho nitro-aniline and cyanamide or cyanamide dihydrochloride, it is possible to control the reaction by refluxing, thereby permitting the preparation of 3-amino-benzotriazine-1,2,4-oxides-1 containing halogen, alkyl, and alkoxy substituents on the benzene portion of the molecule. Previously such compounds have not been prepared, and these new compounds, as well as the improved method preparing them, constitute our invention.

In preparing our new chemical compounds a substituted ortho nitro-aniline is reacted with cyanamide or with cyanamide dihydrochloride. The ortho-nitro-aniline reacted may carry halogen, alkyl, or alkoxy substituents. The reaction is carried out under acidic conditions to form the aromatic guanidine derivative. This compound is then treated with an alkali in order to form the new substituted 3-amino-benzotriazine-1,2,4-oxides-1.

In preparing our new compounds, wherein the benzene ring portion of the benzotriazine derivative is substituted with chlorine, bromine, alkyl or alkoxy, as distinguished from the compounds previously prepared wherein this portion of the molecule has been unsubstituted, we find it generally desirable to control the violence of the reaction, especially the violence of its earlier stages. This is most effectively done by refluxing which permits a higher internal temperature without permitting the reaction to become so violent as to become destructive to material or equipment. In this way we are able to prepare compounds such as the 7-chloro-3-amino-benzotriazine-1,2,4-oxide-1, in large batches, and in very satisfactory yield.

Sometimes it is difficult to bring about reaction between the substituted ortho-nitro-aniline and cyanamide or cyanamide dihydrochloride, and, under these circumstances, it has been found desirable to heat the mixture of reactants to the temperature at which the mixture begins to foam (generally 175–180° C.). This may advantageously be done by heating in an oil bath. The reaction mixture is held at the temperature of incipient foaming for from five to fifteen minutes, whereupon it is diluted with water, rendered alkaline in reaction, and boiled. In this way the reaction proceeds smoothly and the desired substituted 3-amino-benzotriazine-1,2,4-oxides-1 are formed in good yield. The reaction product may then be filtered off and washed with alcohol.

The reactions involved in the production of our new chemical compounds may be represented as follows:

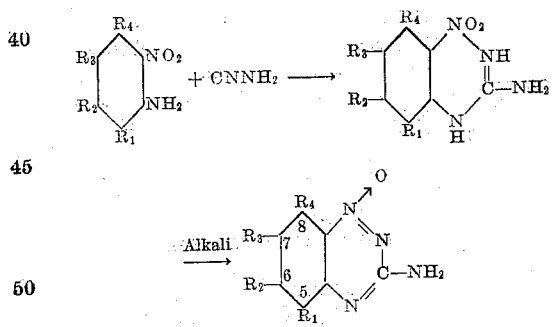

wherein $R_1$, $R_2$, $R_3$ and $R_4$ represent hydrogen, halogen, alkyl or alkoxy. In place of cyanamide, $CNNH_2$, its dihydrochloride $CNNH_2 \cdot (HCl)_2$ may also be reacted with the substituted ortho-nitro-aniline in the first step of the reaction.

The following examples are to be regarded as illustrative, but not restrictive, of our process.

EXAMPLE 1

7-chloro-3-amino-benzotriazine 1,2,4 oxide-1

A solution of 80 g. of 4-chloro-2-nitro-aniline in 160 ml. of glacial acetic acid was heated to reflux and 20 ml. of concentrated hydrochloric acid added. Heating was discontinued and 140 g. of cyanamide and 140 ml. of concentrated hydrochloric acid were added simultaneously at approximately the same rate. The addition was carried out at such a rate that the mixture refluxed gently and required approximately 20 min. After the addition was complete, the temperature was kept at 95–105° C. for 15 minutes by external heating. The solution was then added to ice and made strongly alkaline with 30% sodium hydroxide. A deep orange red suspension was obtained which was heated to boiling with mechanical stirring. During the boiling, a lemon-yellow precipitate was formed (if the material forms a red solution, it is not alkaline enough and more alkali must be added). The hot solution was filtered and the product washed with water and then slurried with 500 ml. of ethanol and dried. The product weighed 63.5 g. (68.7% yield).

By following these procedures the following new chemical compounds have been prepared without difficulty:

1. 3-amino-7-methoxy-benzotriazine-1,2,4-oxide-1; melting point: 258–259° C., (with decomposition).
2. 3-amino-7-chloro-benzotriazine-1,2,4-oxide-1; melting point: 302° C., (with decomposition).
3. 3-amino-7-bromo-benzotriazine-1,2,4-oxide-1; melting point: 294–295° C., (with decomposition).
4. 3-amino-6-chloro-benzotriazine-1,2,4-oxide-1; melting point 293–295° C., (with decomposition).

EXAMPLE 2

5,7 dichloro-3-amino-benzotriazine 1,2,4 oxide-1

A mixture of 5 g. of 4,6 dichloro-2-nitro-aniline and 5 g. of cyanamide dihydrochloride was heated in an oil bath at 180–190° C., with stirring. The foaming, which begins when an internal temperature of about 180° C. is attained, subsides in about 3 minutes. Then two 1 g. portions of cyanamide dihydrochloride were added and the mixture maintained at 180–190° for two minutes after each addition. The melt was dissolved in hot water and made strongly alkaline with 30% sodium hydroxide and boiled. The precipitated product was filtered and washed well by slurrying with two 50 ml. portions of ethanol, yielding 3.2 g. of crude product, melting point 285° C. with decomposition. The crude material was recrystallized from 2-ethoxyethanol having the formula $C_2H_5OCH_2CH_2OH$ and also known as "Cellosolve," melting point 287° C. with decomposition.

By following these procedures the following new chemical compounds have been prepared without difficulty:

1. 3-amino-5-chloro-benzotriazine-1,2,4-oxide-1; melting point 258–260° C., (with decomposition).
2. 3-amino-5,7-dichloro-benzotriazine-1,2,4-oxide-1; melting point 287° C., with decomposition.
3. 3-amino-5-methyl-benzotriazine-1,2,4-oxide-1; the melting point was not observed.

The 3-amino-7-chloro-benzotriazine-1,2,4-oxide-1, and the 3-amino-7-bromo-benzotriazine-1,2,4-oxide-1 appear to be promising therapeutic agents capable of use in the treatment of malaria. The former, melting at 302° C. (with decomposition), is a yellow crystalline material slightly soluble in alcohol to form a solution having a slight greenish fluorescence.

Various changes and modifications may be made in our invention which would fall within the scope thereof. It is our intention that such changes and modifications as are comprehended within the scope of the appended claims shall be considered as part of our invention.

We claim:

1. 3-amino-7-halo-benzotriazine-1,2,4-oxide-1 represented by the formula:

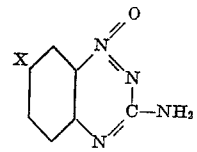

wherein X is a halogen.

2. 3-amino-7-chloro-benzotriazine-1,2,4-oxide-1.
3. 3-amino-7-bromo-benzotriazine-1,2,4-oxide-1.
4. 3-amino-5,7-dichloro benzotriazine-1,2,4-oxide-1 represented by the formula:

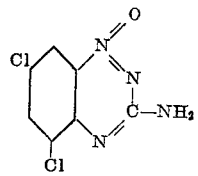

5. A 3-amino-benzotriazine-1,2,4-oxide-1 having the formula:

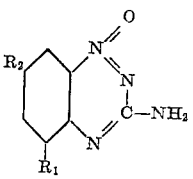

wherein $R_1$ is a radical selected from the group consisting of halogen and hydrogen and $R_2$ represents halogen.

FRANK J. WOLF.
KARL PFISTER III.

REFERENCES CITED

The following references are of record in the file of this patent:

UNITED STATES PATENTS

| Number | Name | Date |
|---|---|---|
| 2,197,357 | Widmer | Apr. 16, 1940 |

FOREIGN PATENTS

| Number | Country | Date |
|---|---|---|
| 486,577 | Great Britain | 1938 |

OTHER REFERENCES

Bischler, Berichte, vol. 22, pp. 2817–2818, 2806 (1889).
Arndt, Berichte, vol. 46, pp. 3522–3529 (1913).
Arndt, Berichte, vol. 50 pp. 1248–1261 (1917).
Parkes, Chem. Soc. J., pp. 1842–1843 (1938).
Beilstein, 4th ed. vol. 26, p. 67.